US009828035B1

United States Patent
Sassi et al.

(10) Patent No.: US 9,828,035 B1
(45) Date of Patent: Nov. 28, 2017

(54) VEHICLE BODY REINFORCING BRACE

(71) Applicant: Ford Global Technologies, LLC, Dearborn, MI (US)

(72) Inventors: Abdelmonaam Sassi, Windsor (CA); Matthew B. Makowski, Northville, MI (US); Frank Timm, Cologne (DE); Tofiqul Islam, Rochester Hills, MI (US); Matthias Hofmann, Langenfeld (DE); Christopher John May, Novi, MI (US); Jaspinder S. Sahi, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/373,960

(22) Filed: Dec. 9, 2016

(51) Int. Cl.
| | |
|---|---|
| *B62D 27/02* | (2006.01) |
| *B62D 25/06* | (2006.01) |
| *B62D 29/00* | (2006.01) |
| *B62D 29/04* | (2006.01) |
| *B62D 23/00* | (2006.01) |
| *B60K 1/04* | (2006.01) |

(52) U.S. Cl.
CPC ............ *B62D 25/06* (2013.01); *B60K 1/04* (2013.01); *B62D 23/005* (2013.01); *B62D 27/02* (2013.01); *B62D 27/026* (2013.01); *B62D 29/007* (2013.01); *B62D 29/008* (2013.01); *B62D 29/043* (2013.01); *B60K 2001/0438* (2013.01); *B60Y 2200/91* (2013.01); *B60Y 2304/03* (2013.01); *B60Y 2410/124* (2013.01)

(58) Field of Classification Search
CPC .... B62D 25/06; B62D 29/043; B62D 27/026; B62D 29/007; B62D 29/008; B62D 27/02; B62D 23/005; B60K 1/04; B60K 2001/0438; B60Y 2410/124; B60Y 2304/03; B60Y 2200/91
USPC ............................... 296/187.13, 210, 216.04
See application file for complete search history.

(56) References Cited

U.S. PATENT DOCUMENTS

| | | | |
|---|---|---|---|
| 9,180,917 B1 | 11/2015 | Wu et al. | |
| 9,187,135 B1 * | 11/2015 | Redmer | B62D 25/025 |
| 9,381,943 B2 | 7/2016 | Kang et al. | |
| 9,381,944 B2 | 7/2016 | Nishimura et al. | |
| 2004/0090087 A1 * | 5/2004 | Kimura | B60J 7/022 |
| | | | 296/203.03 |
| 2006/0202518 A1 * | 9/2006 | Osterberg | B62D 25/06 |
| | | | 296/193.12 |
| 2008/0030050 A1 * | 2/2008 | Chen | B62D 25/06 |
| | | | 296/210 |

(Continued)

FOREIGN PATENT DOCUMENTS

| | | |
|---|---|---|
| CN | 204775494 U | 11/2015 |
| JP | 2006312403 A | 11/2006 |
| JP | 5659998 B2 | 12/2014 |

*Primary Examiner* — Jason S Morrow
*Assistant Examiner* — E Turner Hicks
(74) *Attorney, Agent, or Firm* — Jason C. Rogers; Bejin Bieneman PLC (57) ABSTRACT

A vehicle body includes a roof rail elongated along a longitudinal axis, and first and second bows each connected to the roof rail. A brace includes a base, a first arm and a second arm. The base is elongated along the longitudinal axis, with the first arm extending from the base along the first bow and fixed to the first bow, and the second arm spaced from the first arm and extending from the base along the second bow and fixed to the second bow.

18 Claims, 8 Drawing Sheets

(56) References Cited

U.S. PATENT DOCUMENTS

| | | | |
|---|---|---|---|
| 2011/0254322 A1* | 10/2011 | Adamski | B60J 7/022 296/216.08 |
| 2013/0082484 A1* | 4/2013 | Wagner | B62D 25/06 296/210 |
| 2014/0225399 A1* | 8/2014 | Ono | B62D 25/06 296/210 |
| 2014/0327273 A1* | 11/2014 | Yasukata | B62D 25/04 296/203.03 |
| 2016/0101672 A1 | 4/2016 | Oshima | |

* cited by examiner

VEHICLE BODY REINFORCING BRACE

BACKGROUND

Gasoline-powered vehicles are often lighter than their battery-powered derivatives, in part due to battery weight. For example, a gasoline-powered 2017 Ford Focus can have a curb weight of between 2,935 and 3,055 lbs. A 2017 Ford Focus Electric can have a curb weight of 3,640 lbs.

Vehicle bodies generally include pillars, often referred to as A, B, C and D pillars. A vehicle body can also include roof rails and bows. Roof rails are elongated longitudinally in a vehicle-forward to a vehicle-rearward direction on opposite lateral sides of a vehicle, and may be supported by the pillars. Bows generally extend transversely between the roof rails. The roof rails may support the bows.

Figure 1A:
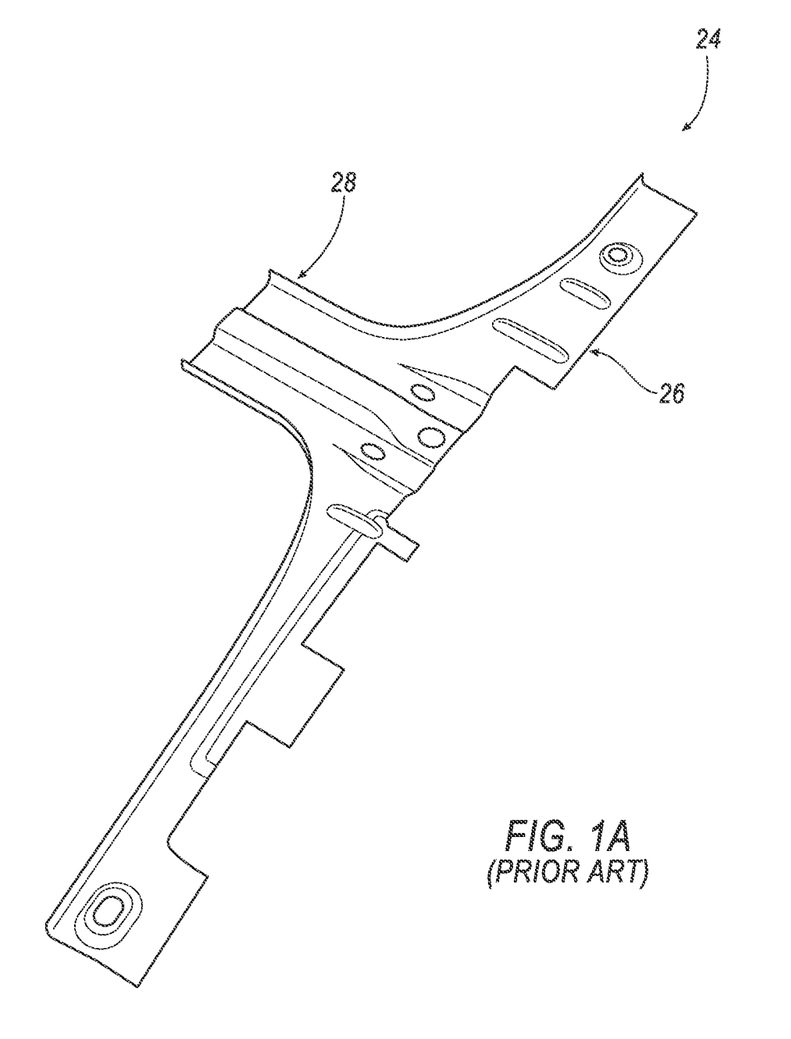
FIG. 1A is a perspective view of a prior art T-brace.
Figure 1B:
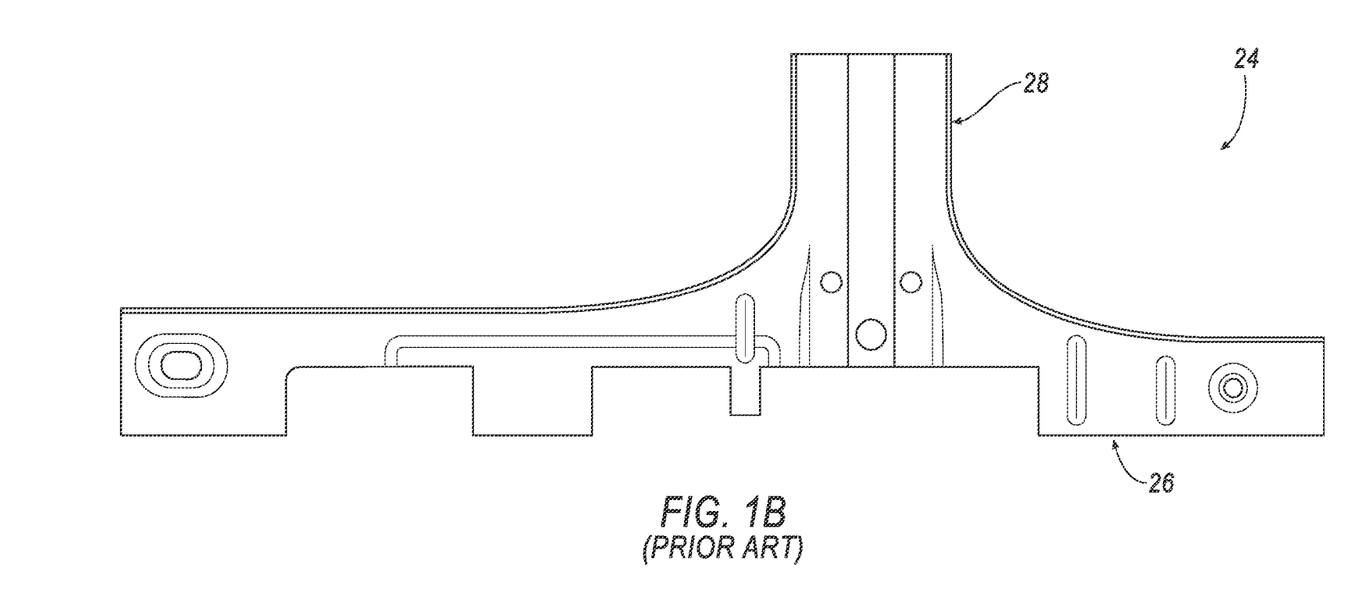
FIG. 1B is a top view of the prior art T-brace.
Figure 1C:
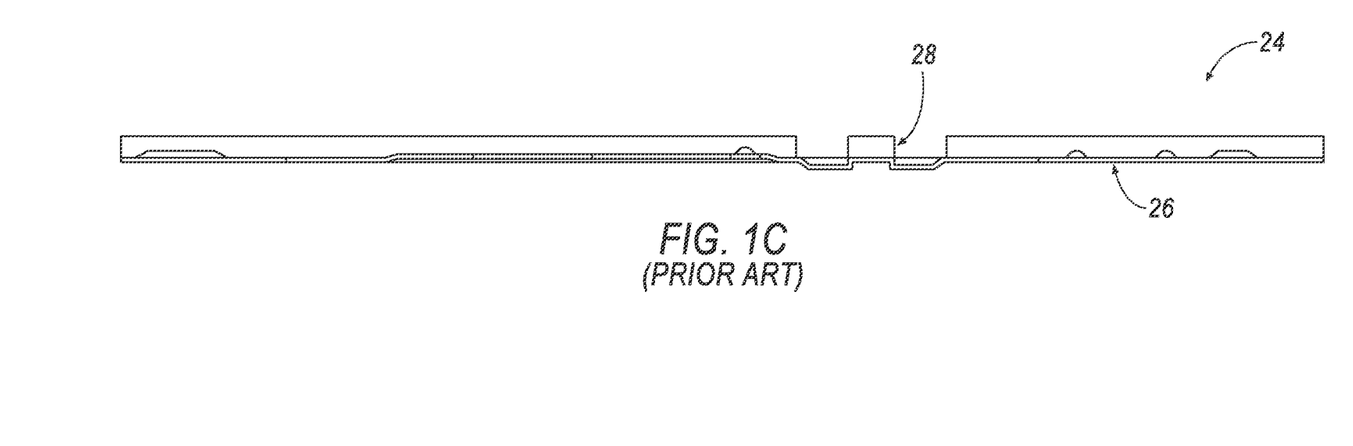
FIG. 1C is a side view of the prior art T-brace.
Figure 1D:
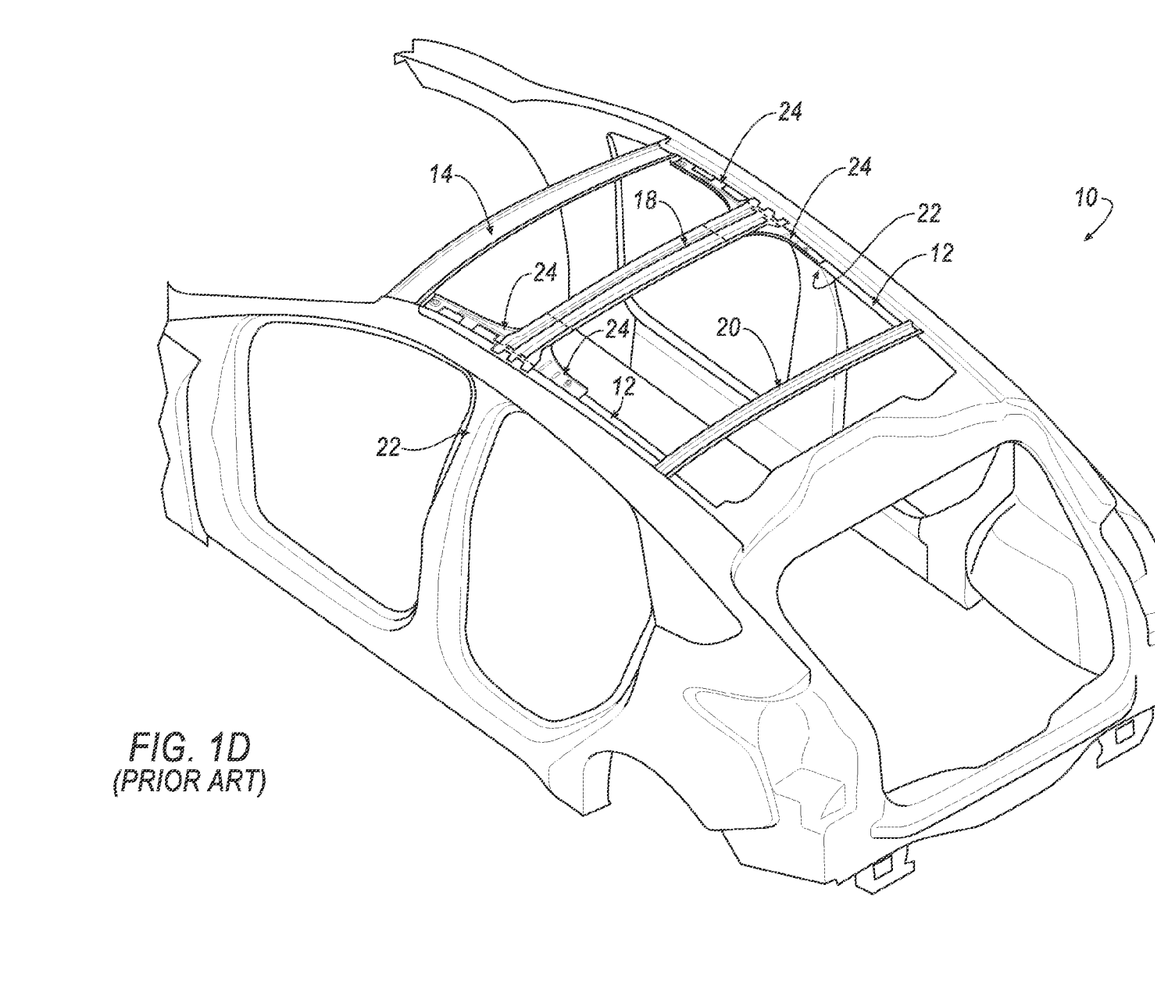
FIG. 1D is a perspective view of a vehicle body including the prior art T-brace.
Figure 1E:
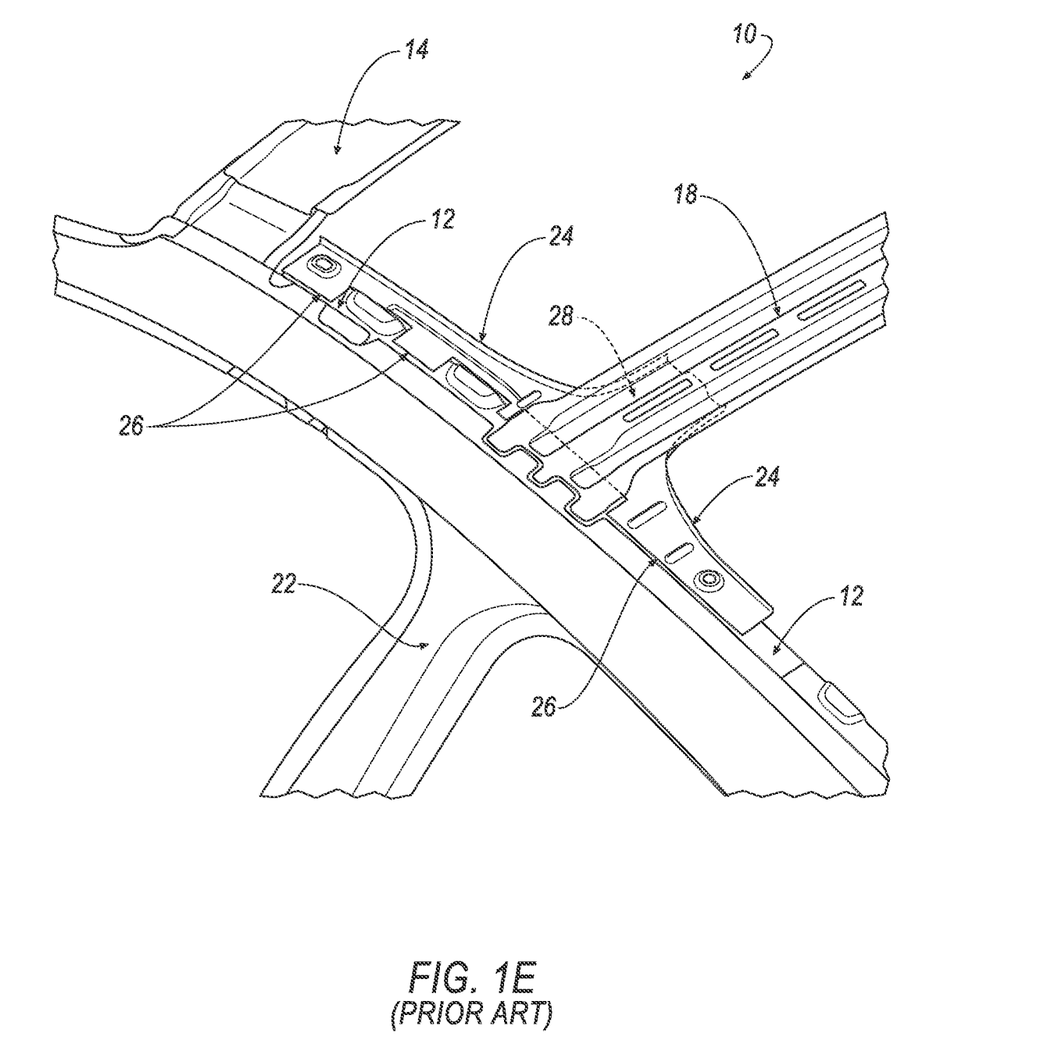
FIG. 1E is a magnified perspective view of the vehicle body including the prior art T-brace.

The prior art Ford Focus Electric includes a T-brace 24. Drawings of the prior art Focus Electric T-brace 24 are shown in FIGS. 1A-E. The prior art T-brace 24 has a base 26 and an arm 28, as shown in FIGS. 1A-C. As shown in FIGS. 1C-E, when installed on a vehicle body 10, the base 26 of the prior art T-brace 24 extends longitudinally along a roof rail 12 and across a pillar 22, and is spot-welded along a length of the base 26 to the roof rail 12. The arm 28 of the prior art T-brace 24 extends from the base 26 along a length of a first bow 18, and is spot-welded to the first bow 18.

DETAILED DESCRIPTION

With reference to the Figures, wherein like numerals indicate like parts throughout the several views, a vehicle body 10 includes roof rails 12 elongated along a longitudinal axis A. A first bow 18 and a second bow 20 are each connected to the roof rails 12.

For example, the roof rails 12 may each include a first bow platform 48 supporting the first bow 18 and a second bow platform 50 supporting the second bow 20. The first bow 18 may be fixedly joined to the first bow platform 48 of the roof rail 12, and the second bow 20 may be fixedly joined to the second bow platform 50 of the roof rail 12. The first and second bows 18, 20 may be welded or otherwise fixedly joined to first and second bow platforms 48, 50 of the roof rails 12, respectively, in any suitable manner, e.g., fasteners, adhesives, combinations thereof, etc.

A brace 30 includes a base 32 elongated along the longitudinal axis A of the roof rail 12. The brace 30 includes a first arm 34 extending from the base 32 along the first bow 18 and fixed to the first bow 18, and a second arm 36 spaced from the first arm 34 and extending from the base 32 along the second bow 20 and fixed to the second bow 20. The first and second arms 34, 36 of the brace 30 may be welded or otherwise fixed to first and second bows 18, 20, respectively, in any suitable manner, e.g., fasteners, adhesives, combinations thereof, etc.

The vehicle body 10 may have a unibody construction, a body-on-frame construction, or any other suitable construction. The vehicle body 10 can be formed of any suitable material, for example, steel, aluminum, carbon fiber, etc.

The vehicle body 10 can be for a battery electric vehicle (BEV). BEVs include batteries that store energy that the vehicle uses to operate. The batteries can be located beneath a floor of the vehicle to prevent creating additional packaging constraints in areas of the vehicle where space is crowded and/or valuable, e.g., the engine compartment, the trunk space, etc. The batteries can increase a BEV's weight relative to a gas-powered counterpart. Moreover, additional structures surrounding the batteries are generally included in the BEV to protect the batteries, further increasing the BEV's weight.

As discussed above, the vehicle body 10 can include pillars 22, roof rails 12, and bows, such as the first and second bows 18, 20. The vehicle body 10 can further include a roof header 14. The roof header 14 and the first and second bows 18, 20 may extend from the roof rails 12, e.g., in a cross-vehicle direction, with the roof header 14 spaced from the first and second bows 18, 20. The roof header 14 may be welded or otherwise fixedly joined to the roof rails 12 in any suitable manner, e.g., fasteners, adhesives, combinations thereof, etc.

The pillars 22, the roof rails 12, the roof header 14, and the bows, including the first and second bows 18, 20, can be constructed from, e.g., metal panels formed in a stamping process and fixed together with welds, fasteners, adhesives, etc. Alternatively, one or more of the pillars 22, the roof rails 12, the roof header 14, and the bows, including the first and second bows 18, 20, can be formed from a single metal panel. Alternatively, one or more of the pillars 22, the roof rails 12, the roof header 14, and the bows, including the first and second bows 18, 20, may be constructed from other suitable materials, e.g., carbon fiber.

The Federal Motor Vehicle Safety Standard (FMVSS) 214 for "Side Impact Protection" was adopted to evaluate occupant protection in side impact events. In side impact events, forces generated by the impact may result in the pillars 22 and the roof rails 12 of the vehicle body 10 being urged inward toward a passenger cabin. In addition, a roof panel (not shown) and the first and second bows 18, 20 may buckle in response to the side impact event. As one example, when the vehicle is a BEV, as described above, the weight of the vehicle may cause the vehicle to absorb relatively high loads during the side impact event, instead of moving, i.e., bouncing off, the impact. The brace 30 reinforces the roof rails 12, the first bow 18, the second bow 20, and the roof panel, among other things. In this way, the brace 30 may assist in reducing intrusion of the pillars 22, the roof rails 12, the roof panel and the first and second bows 18, 20 into the passenger cabin during an impact event.

Figure 2A:
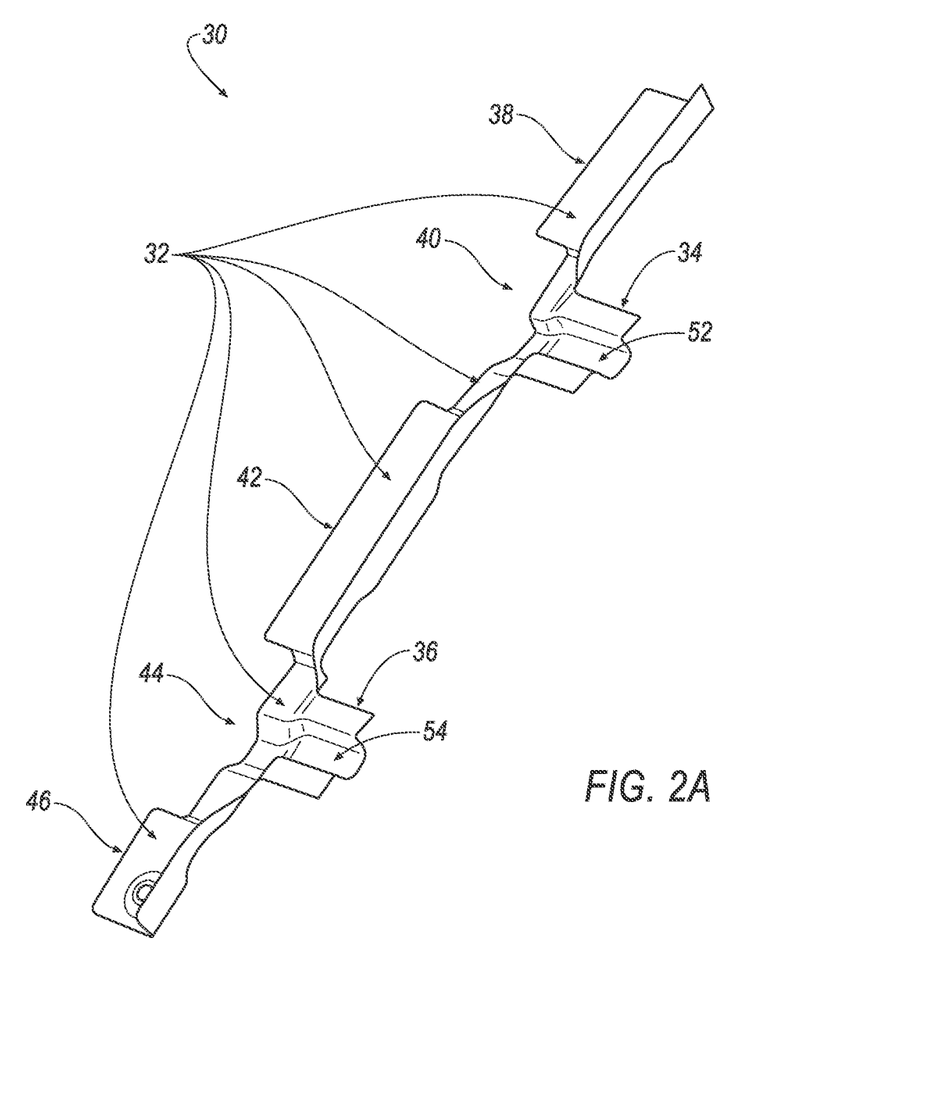
FIG. 2A is a perspective view of a brace.
Figure 2B:
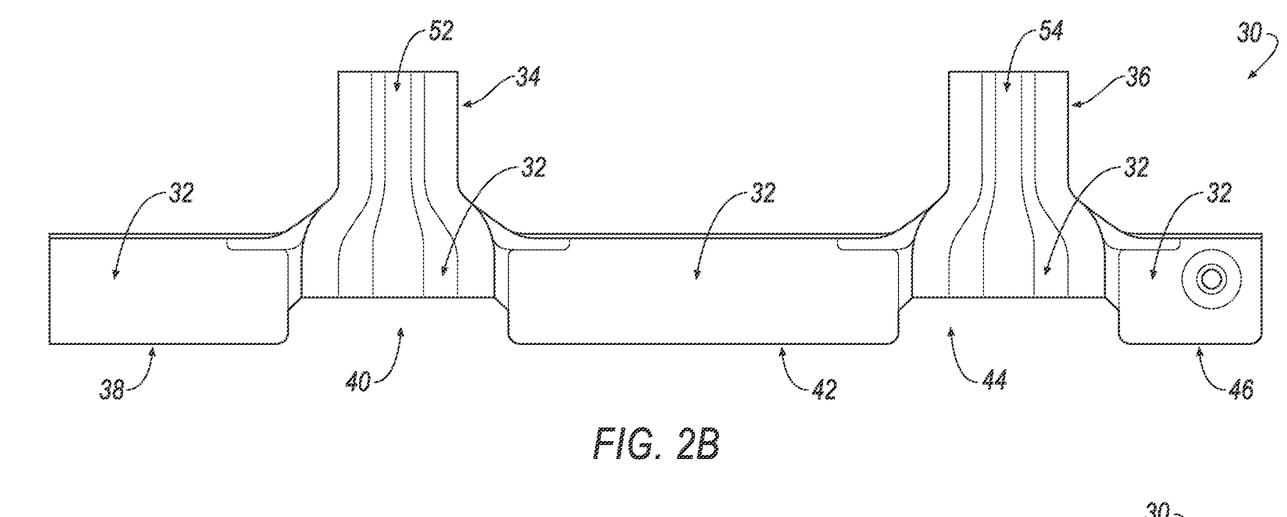
FIG. 2B is a top view of the brace.
Figure 2C:
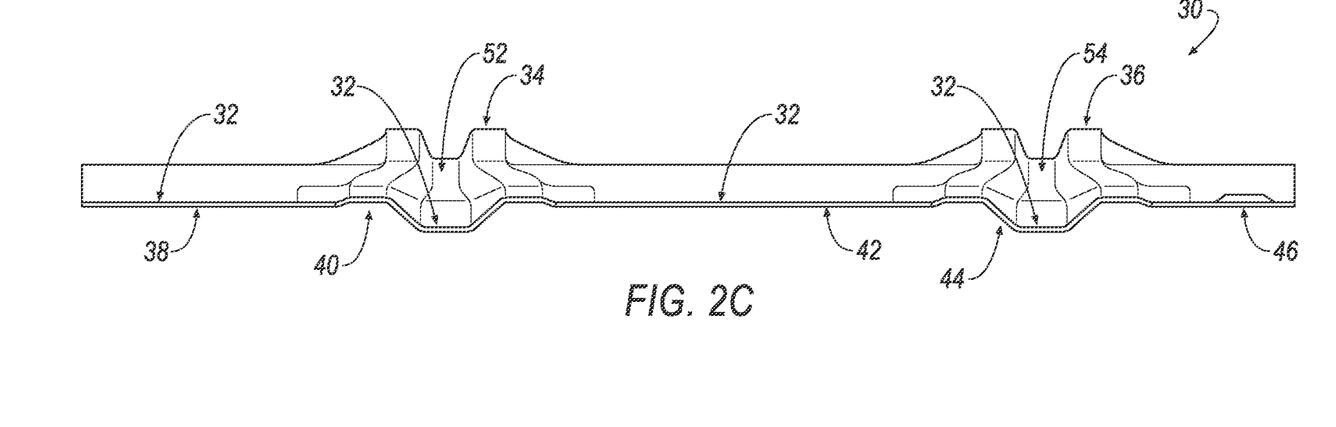
FIG. 2C is a side view of the brace.

As shown in FIGS. 2A-C, the brace 30 includes the base 32. The first arm 34 extends from the base 32. The second arm 36 is spaced from the first arm 34 and extends from the base 32. While the brace 30 shown in FIGS. 2A-4 includes a first arm 34 and a second arm 36, it is to be understood that the brace 30 could include additional arms, such as a third arm, a fourth arm, etc. The third and fourth arms, etc., could be fixed to additional bows in the manner discussed herein.

Figure 3:
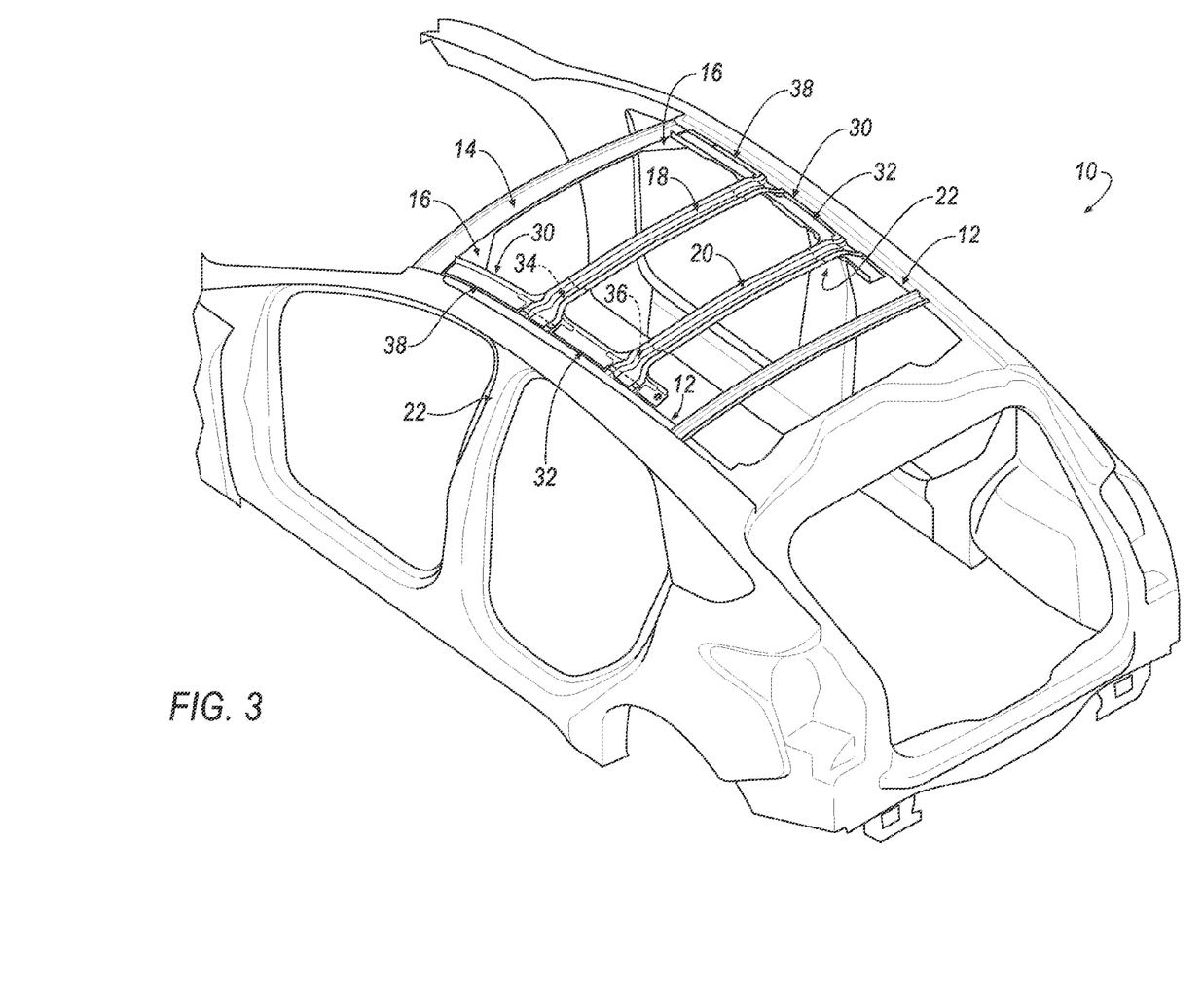
FIG. 3 is a perspective view of a vehicle body including the brace.
Figure 4:
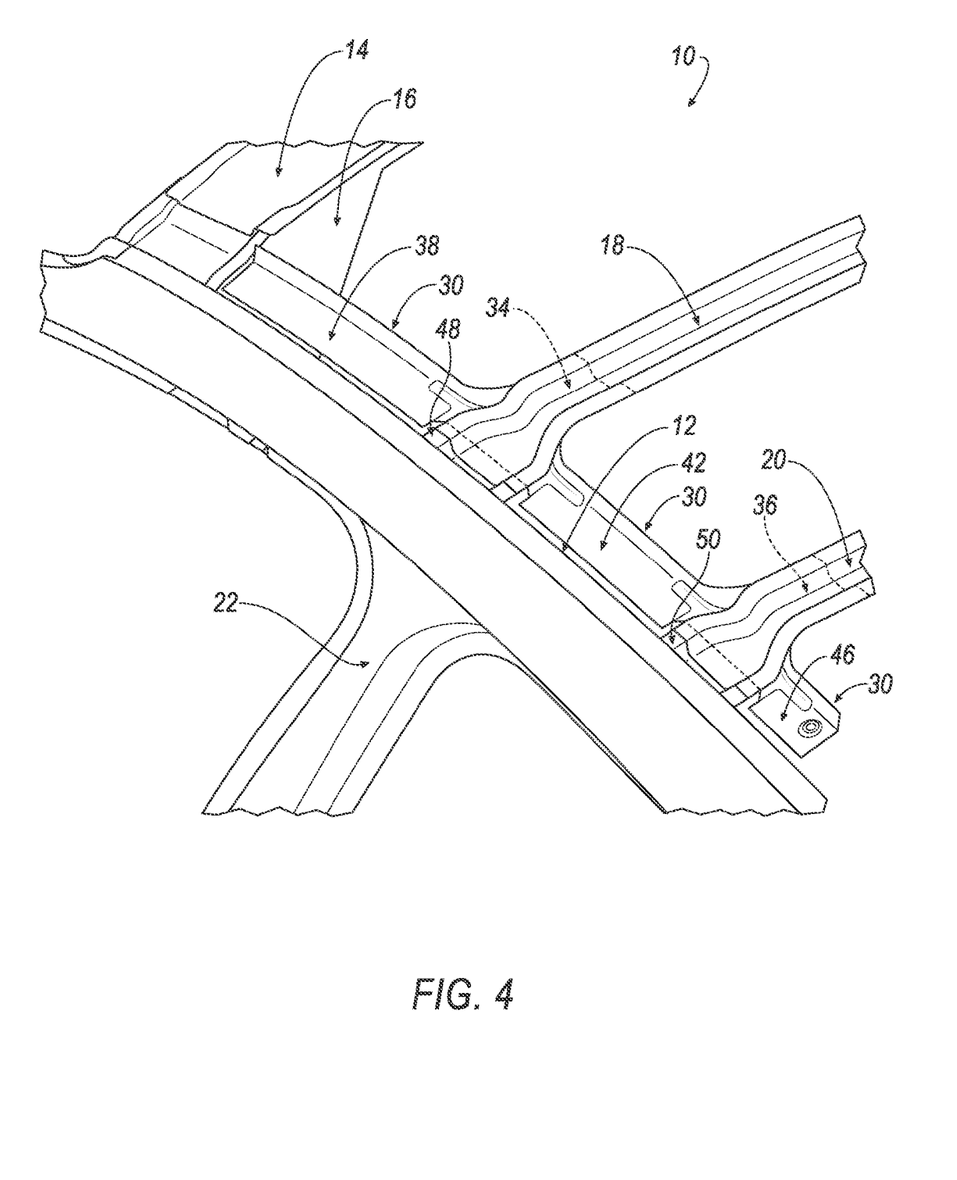
FIG. 4 is a magnified perspective view of the vehicle body including the brace.

Referring back to FIGS. 2A-C, the base 32 of the brace 30 includes a first end portion 38, a first cutout 40, a middle portion 42, a second cutout 44, and a second end portion 46. As shown in FIGS. 3-4, the base 32 is elongated along the longitudinal axis A of the roof rail 12 when installed on the vehicle body 10, and spaced from the roof rail 12, e.g., in the cross-vehicle direction. For example, the first end portion 38, the first cutout 40, the middle portion 42, the second cutout 44, and the second end portion 46 of the base 32 are spaced from the roof rail 12.

The base 32 of the brace 30 may be welded or otherwise fixedly joined to the roof header 14 in any suitable manner, e.g., fasteners, adhesives, combinations thereof, etc. For example, the roof header 14 can include gussets 16, as shown in FIGS. 3 and 4. The first end portion 38 of the base 32 of the brace 30 may overlap and be in contact with the gusset 16, e.g., a bottom side of the first end portion 38 of the base 32 of the brace 30 may contact a top side of the gusset 16 of the roof header 14, with the bottom side of the first end portion 38 of the brace 30 welded or fixedly joined to the top side of the gusset 16 of the roof header 14, as discussed above. Alternatively, the roof header 14 could include a supplemental attachment (not shown), and the first end portion 38 of the base 32 of the brace 30 could be welded or fixedly joined to the supplemental attachment.

The first cutout 40 of the base 32 is between the first end portion 38 and the middle portion 42 of the base 32 of the brace 30. As shown in FIGS. 3-4, when the brace 30 is installed in the vehicle body 10, the first cutout 40 of the base 32 can be aligned with the pillar 22 along the longitudinal axis A of the roof rail 12, with the pillar 22 extending from the roof rail 12. The first cutout 40 may be sized to receive the first bow platform 48 of the roof rail 12. In this way, the first bow 18 may be fixedly joined to the first bow platform 48 of the roof rail 12. For example, the first bow 18 may be welded or otherwise fixedly joined to the first bow platform 48 of the roof rail 12 in any suitable manner, e.g., fasteners, adhesives, combinations thereof, etc.

The middle portion 42 of the base 32 is between the first arm 34 and the second arm 36 of the brace 30, and the first cutout 40 and the second cutout 44 of the base 32. As discussed above and shown in FIGS. 3-4, the middle portion 42 of the base 32 of the brace 30 is spaced from the roof rail 12, and extends along the longitudinal axis A of the roof rail 12. The first end portion 38 of the base 32 can extend along the longitudinal axis A of the roof rail 12 from the middle portion 42 and the first arm 34. The second end portion 46 of the base 32 can extend along the longitudinal axis A of the roof rail 12 from the middle portion 42 and the second arm 36.

The second cutout 44 of the base 32 is between the middle portion 42 and the second end portion 46 of the base 32 of the brace 30. As shown in FIGS. 3-4, when the brace 30 is installed in the vehicle body 10. The second cutout 44 may be sized to receive the second bow platform 50 of the roof rail 12. In this way, the second bow 20 may be fixedly joined to the second bow platform 50 of the roof rail 12. For example, the second bow 20 may be welded or otherwise fixedly joined to the second bow platform 50 of the roof rail 12 in any suitable manner, e.g., fasteners, adhesives, combinations thereof, etc.

As discussed above, the second end portion 46 of the base 32 extends along the longitudinal axis A of the roof rail 12 from the middle portion 42 and the second arm 36 of the brace 30.

Referring back to FIGS. 2A-C, the first arm 34 and the second arm 36 extend from the base 32 of the brace 30, with the second arm 36 spaced from the first arm 34. The first arm 34 can be adjacent the first cutout 40 of the base 32, and may extend is a direction opposite a direction of the first cutout 40. The second arm 36 can be adjacent the second cutout 44 of the base 32, and may extend is a direction opposite a direction of the second cutout 44. The first and second arms 34, 36 may be fixedly joined to the first bow 18 and the second bow 20, respectively. For example, the first and the second arms 34, 36 may be welded or otherwise fixedly joined to the first bow 18 and the second bow 20 in any suitable manner, e.g., fasteners, adhesives, combinations thereof, etc.

The first and the second arms 34, 36 may each include a rib 52, 54, respectively. The rib 52 of the first arm 34 may be between a portion of the base 32 defining the first cutout 40 along a length of the first arm 34. For example, the rib 52 may extend from the portion of the base 32 defining the first cutout 40 to an end of the first arm 34. When the brace 30 is installed in the vehicle body 10 as shown in FIGS. 3-4, the rib 52 can extend in the cross-vehicle direction.

The rib 54 of the second arm 36 may be between a portion of the base 32 defining the second cutout 44 along a length of the second arm 36. For example, the rib 54 may extend from the portion of the base 32 defining the second cutout 44 to an end of the second arm 36. When the brace 30 is installed in the vehicle body 10 as shown in FIGS. 3-4, the rib 54 can extend in the cross-vehicle direction.

The brace 30 can be constructed from, e.g., panels formed in a stamping process and fixed together with welds, fasteners, adhesives, etc. Alternatively, the brace 30 can be formed from a single panel. Alternatively, the brace 30 may be constructed from metal, e.g., steel, aluminum, etc., or other suitable materials, e.g., carbon fiber.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle body comprising:
    a roof rail elongated along a longitudinal axis;
    a roof header extending from the roof rail;
    first and second bows spaced from the roof header along the longitudinal axis, the first and second bows each connected to the roof rail; and
    a brace including a base elongated along the longitudinal axis, a first arm extending from the base along the first bow and fixed to the first bow, and a second arm spaced from the first arm and extending from the base along the second bow and fixed to the second bow.

2. The vehicle body of claim 1, wherein the base is spaced from the roof rail.

3. The vehicle body of claim 1, wherein first and second bows extend from the roof rail in a cross-vehicle direction and wherein the base is spaced from the roof rail in the cross-vehicle direction.

4. The vehicle body of claim 3, wherein the first arm and the second arm each include a rib extending in the cross-vehicle direction.

5. The vehicle body of claim 1, further comprising a pillar extending from the roof rail and aligned with the brace along the longitudinal axis of the roof rail.

6. The vehicle body of claim 1, further comprising a pillar extending from the roof rail, and wherein the base of the brace includes a cutout between the first and second arms, the cutout aligned with the pillar along the longitudinal axis of the roof rail.

7. The vehicle body of claim 6, wherein the cutout is spaced from the roof rail.

8. The vehicle body of claim 1, wherein the first bow, the second bow, and the roof header each extend in a cross-vehicle direction from the roof rail.

9. The vehicle body of claim 1, wherein the roof rail includes a first bow platform supporting the first bow, and a second bow platform supporting the second bow, and wherein the base of the brace includes cutout receiving the first bow platform, and a second cutout receiving the second bow platform.

10. The vehicle body of claim 9, wherein the brace is spaced from the roof rail along the cutout and along the second cutout.

11. The vehicle body of claim 9, wherein the base of the brace includes a middle portion between the first cutout and the second cutout, and wherein the brace is spaced from the roof rail along the first cutout, the second cutout, and the middle portion.

12. The vehicle body of claim 11, further comprising a pillar extending from the roof rail, and wherein the first cutout of the base is aligned with the pillar along the longitudinal axis of the roof rail.

13. The vehicle body of claim 1, wherein the base includes a middle portion extending along the longitudinal axis between the first and second arms, a first end portion extending from the middle portion and the first arm along the longitudinal axis, and a second end portion extending from the middle portion and the second arm along the longitudinal axis.

14. The vehicle body of claim 13, further comprising a roof header extending from the roof rail spaced from the first and second bows, wherein the first end portion of the base is fixed to the roof header.

15. The vehicle body of claim 13, wherein the middle portion, the first end portion, and the second end portion are spaced from the roof rail.

16. The vehicle body of claim 13, further comprising a pillar extending from the roof rail, and wherein the middle portion of the base is aligned with the pillar along the longitudinal axis of the roof rail.

17. The vehicle body of claim 16, wherein the roof rail includes a first bow platform supporting the first bow, and a second bow platform supporting the second bow, and wherein the base of the brace includes first cutout receiving the first bow platform between the first end portion and the middle portion, and a second cutout receiving the second bow platform between the second end portion and the middle portion.

18. The vehicle body of claim 17, wherein base of the brace is spaced from the roof rail along the first end portion, the first cutout, the middle portion, the second cutout, and the second end portion.

* * * * *